United States Patent
Schuetz

(10) Patent No.: US 6,948,857 B2
(45) Date of Patent: Sep. 27, 2005

(54) BEARING SYSTEM

(75) Inventor: Michael Schuetz, Schliengen (DE)

(73) Assignee: Carl Freudenberg KG (DE)

( * ) Notice: Subject to any disclaimer, the term of this patent is extended or adjusted under 35 U.S.C. 154(b) by 43 days.

(21) Appl. No.: 10/403,654

(22) Filed: Mar. 31, 2003

(65) Prior Publication Data
US 2003/0219183 A1 Nov. 27, 2003

(51) Int. Cl.$^7$ ............................................. F16C 23/08
(52) U.S. Cl. ............................. 384/498; 384/536
(58) Field of Search ................... 384/498, 558, 384/535, 536, 581, 582

(56) References Cited

U.S. PATENT DOCUMENTS 4,595,302 A * 6/1986 Attinger et al. ............ 384/558
5,058,867 A   10/1991 Hadano et al. ............ 267/141.3

FOREIGN PATENT DOCUMENTS

DE  3933163  5/1990

* cited by examiner

Primary Examiner—Lenard A. Footland
(74) Attorney, Agent, or Firm—Harness, Dickey & Pierce, P.L.C.

(57) ABSTRACT

A bearing system includes a ball-and-socket joint (1) having an annular spherical body (2) and a congruently shaped, socket-type guide ring (3) for accommodating the spherical body (2), the ball-and-socket joint (1) being radially connected to an elastic annular spring element (4) made of an elastomer material and also being radially connected to a bearing (5); the spring element (4) being connected to a housing (6) on the side facing radially away from the ball-and-socket joint (1); the bearing (5) being able to execute cardanic movements relative to the housing (6); and the facing surfaces (7, 8) of the ball-and-socket joint (1) and housing (6) being always positioned relative to each other in a manner that avoids relative cardanic movements during operation of the bearing system as intended.

17 Claims, 6 Drawing Sheets

BEARING SYSTEM

Priority to German Patent Application No. 102 15 221.7-12, filed Apr. 6, 2002 and hereby incorporated by reference herein, is claimed.

BACKGROUND INFORMATION

The present invention relates to a bearing system.

Bearing systems are generally known and used, for example, to support shafts. Previously known bearing systems include, for example, a bearing designed as a rolling or plain bearing that is directly connected via a spring element made of an elastomer material to a housing surrounding the radially outer circumference of the bearing. Bearing systems of this type have satisfactory operating characteristics over a sufficiently long service life only if the connecting surfaces of the spring element on the radially adjoining internal and external machine elements do not execute cardanic movements relative to each other. The supported shaft, bearing, and housing must therefore always be positioned with their axes parallel to each other during proper operation of the bearing system.

When the shaft executes cardanic movements relative to the spring element, the latter is subjected to variable tensile and compressive stresses, viewed along its circumference, which is disadvantageous in view of good operating characteristics maintained over a long service life. The spring element becomes damaged and/or is destroyed.

BRIEF SUMMARY OF THE INVENTION

An object of the present invention is to further develop a bearing system so that the latter maintains consistently good operating characteristics over a long service life even if the shaft executes cardanic movements relative to the spring element. An alternate or additional object of the present invention is to avoid unwanted stresses within the spring element during operation.

The present invention provides a bearing system including a ball-and-socket joint having an annular spherical body and a congruently shaped, socket-type guide ring for accommodating the spherical body, the ball-and-socket joint being radially connected to an elastic annular spring element made of an elastomer material and also being radially connected to a bearing. The spring element is connected to a housing on the side facing radially away from the ball-and-socket joint, and the bearing is able to execute cardanic movements relative to the housing. The facing surfaces of the ball-and-socket joint and housing always are positioned relative to each other in a way that avoids execution of relative cardanic movements during proper operation of the bearing system. It is important that the spring element not be subjected to cardanic stresses, even if the shaft to be mounted on bearings, and thus the bearing surrounding the shaft, executes cardanic movements relative to the housing. This reliably avoids undesirably high local tensile stresses within the spring element, which may result in damage or destruction. The connecting surfaces of the spring element that are diametrically opposed in the radial direction are always positioned relative to each other in a way that avoids execution of relative cardanic movements during operation of the bearing system as intended. The bearing system described above is especially advantageous if, in a longitudinal section view of the bearing system, the spring element is designed to have a largely C-shaped bend. Springs having a bend of this type are especially sensitive to tensile stresses. The spring element is elastic in the radial and/or axial directions, and a rolling or plain bearing may be used as the bearing, depending on the application at hand.

According to a first embodiment, the spring element is directly joinable to the facing surfaces of the ball-and-socket joint and the housing. In this regard, it is advantageous that the bearing system has a simple construction using a minimum number of parts to permit economical manufacture.

The spring element is adhesively joinable to the surfaces. The integrally joined connection is achievable, for example, by gluing or vulcanizing the components.

According to another embodiment, the spring element is connectable, at least on the side facing the ball-and-socket joint, to a sleeve that snugly surrounds the ball-and-socket joint. The sleeve and radially adjacent component of the ball-and-socket joint are connectable in a non-positive manner, for example by shrink-fitting. Unlike the embodiment in which the spring element is directly joined to the facing surfaces of the ball-and-socket joint and housing, it is advantageous for the spring element and sleeve to be replaceable independently of the ball-and-socket joint or the unit surrounding the ball-and-socket joint and bearing. For example, if the spring element or ball-and-socket joint is defective, the defective component is replaceable independently of the ball-and-socket joint or the spring element. This is a significant advantage in minimizing operating costs during operation of the bearing system.

The spherical body may form a constituent part of the bearing. In this case, the side of the bearing that radially faces the spring element is provided, in a longitudinal section view of the bearing system, with a largely semispherical surface that is accommodated in the guide ring. Although the bearing has a comparatively complex design, the bearing system as a whole is advantageously constructed from few parts. A rolling or plain bearing may be used as the bearing.

The guide ring may be designed in two parts, viewed from the longitudinal section of the sealing system, and include two shells that are positioned next to each other at an axial distance. The gap formed by the distance may be designed as a lubricant groove for lubricating the contact surfaces of the spherical body and guide ring. The lubricant groove is fillable, for example, with a lubricating grease.

The shells may be provided with a mirror-symmetrical design, relative to an imaginary radial plane that extends axially through the center of the bearing system. The shells, which are designed as identical parts, make it possible to easily and economically manufacture the bearing system. The identical design of the shells minimizes assembly errors.

The bearing system described above is preferably used as a cardan shaft bearing in motor vehicles.

BRIEF DESCRIPTION OF THE DRAWINGS

Three exemplary embodiments of the bearing system according to the present invention are explained in greater detail below on the basis of FIGS. 1 through 3. These figures provide schematic representations as follows.

DETAILED DESCRIPTION

Figure 1A:
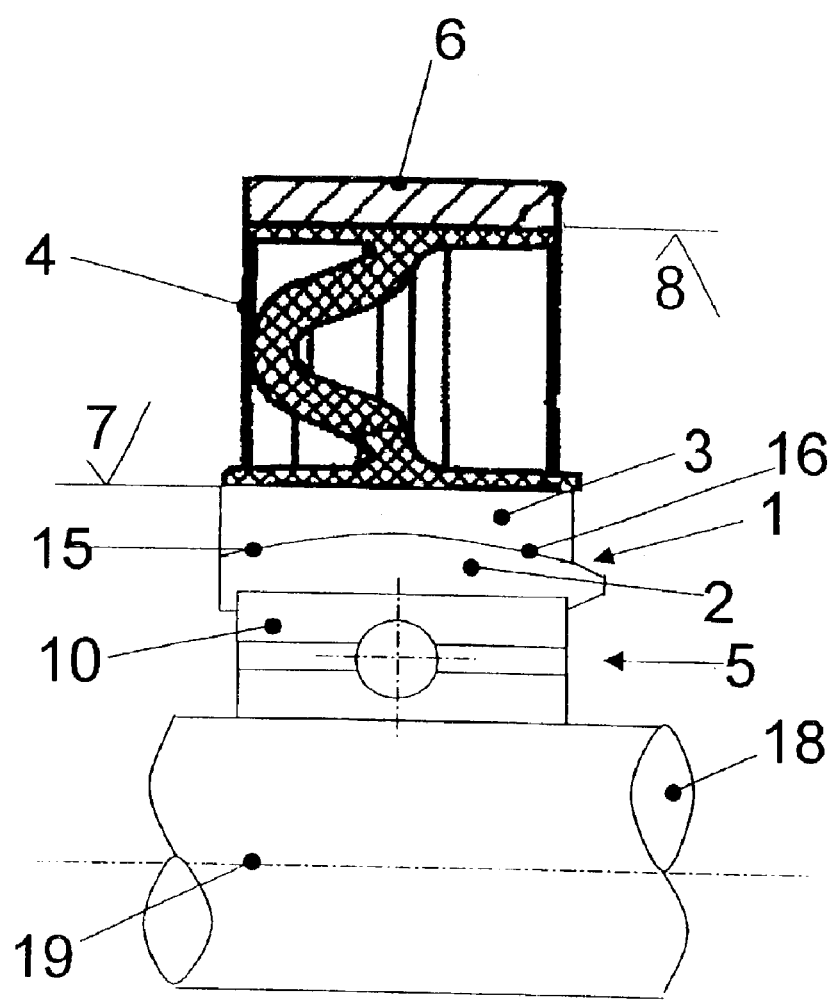
FIGS. 1a and 1b show a first exemplary embodiment in which, viewed from the radial direction, the spring element comes into direct contact with the facing surfaces of the ball-and-socket joint and the housing and is connected thereto.
Figure 1B:
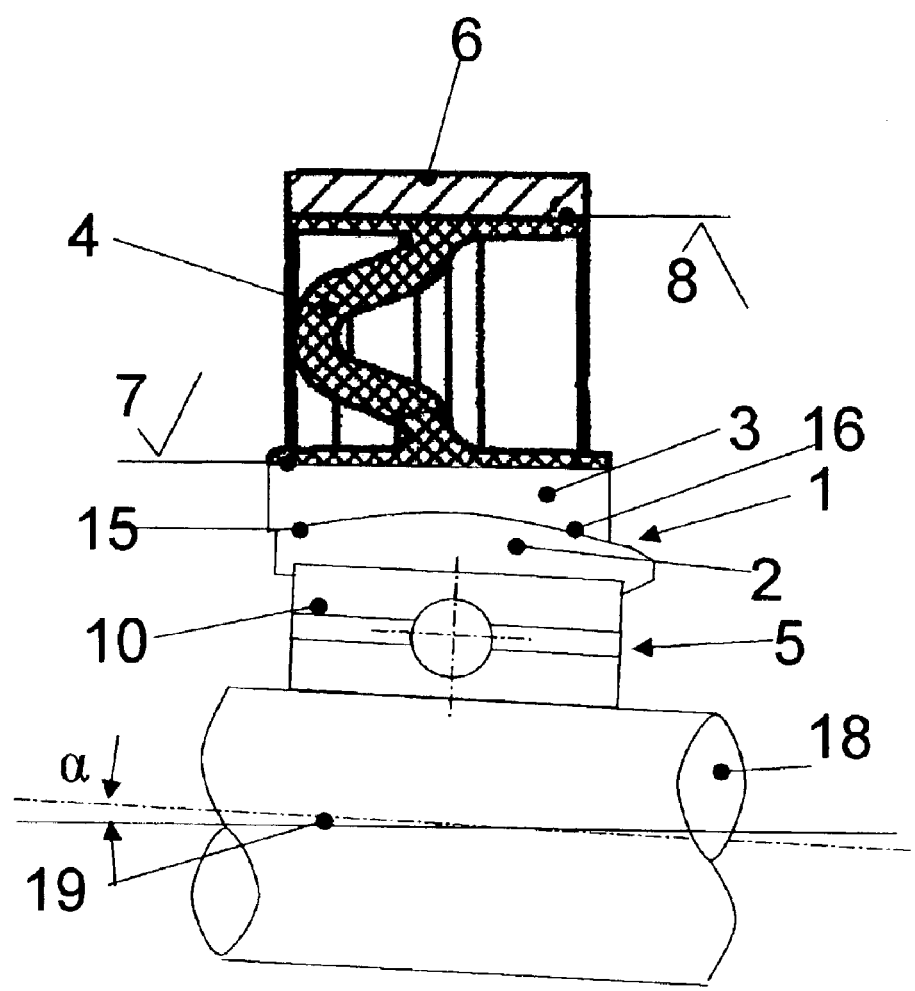
Figure 2A:
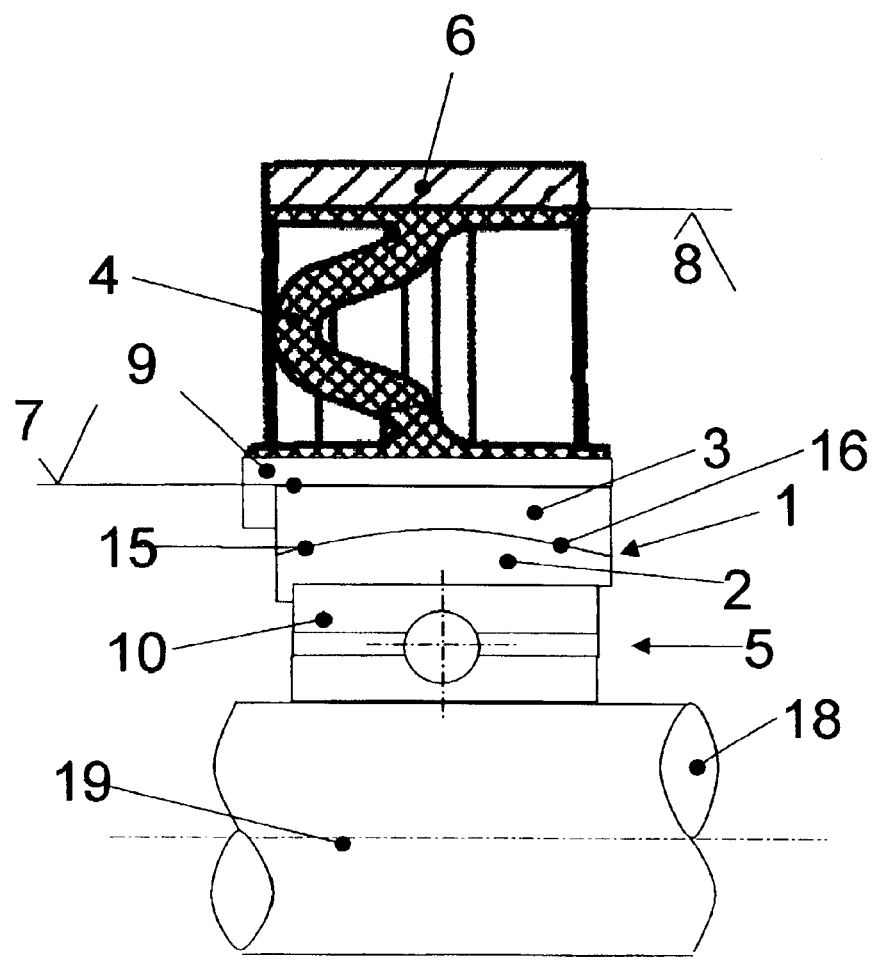
FIGS. 2a and 2b show a second exemplary embodiment that differs from the first exemplary embodiment in FIGS. 1a and 1b in that it has a sleeve positioned radially between the guide ring of the ball-and-socket joint and the spring element.
Figure 2B:
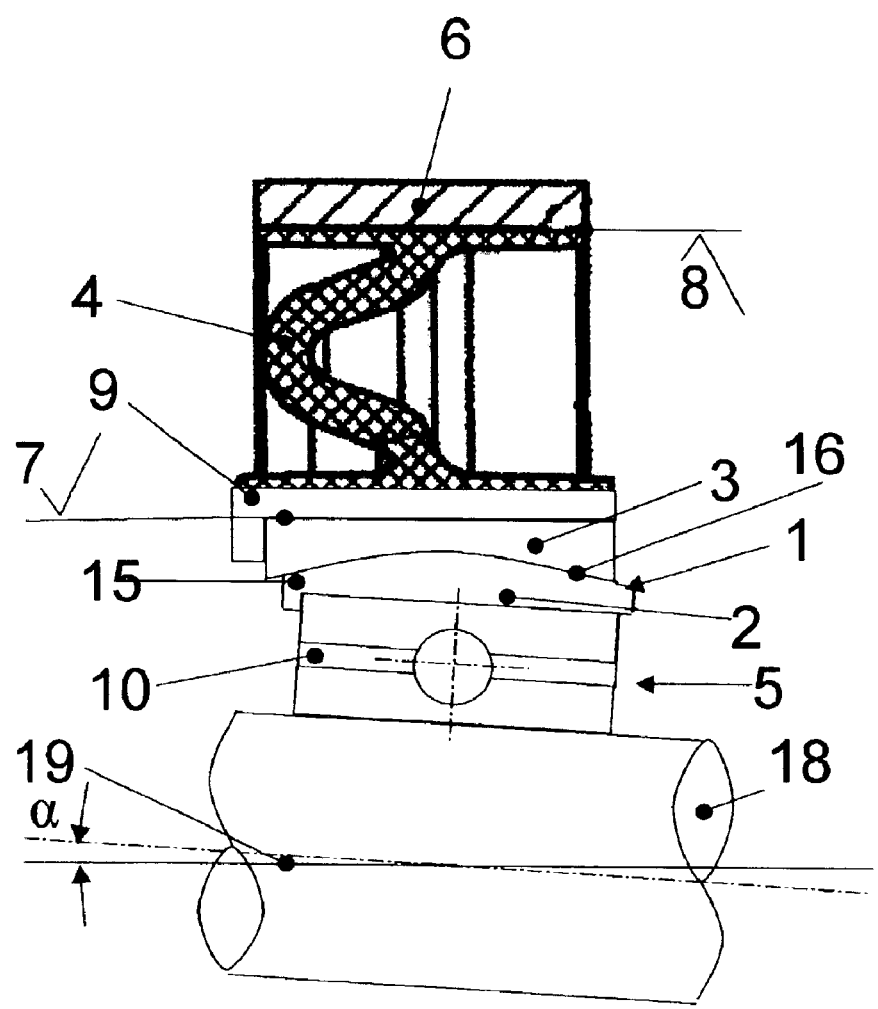
Figure 3A:
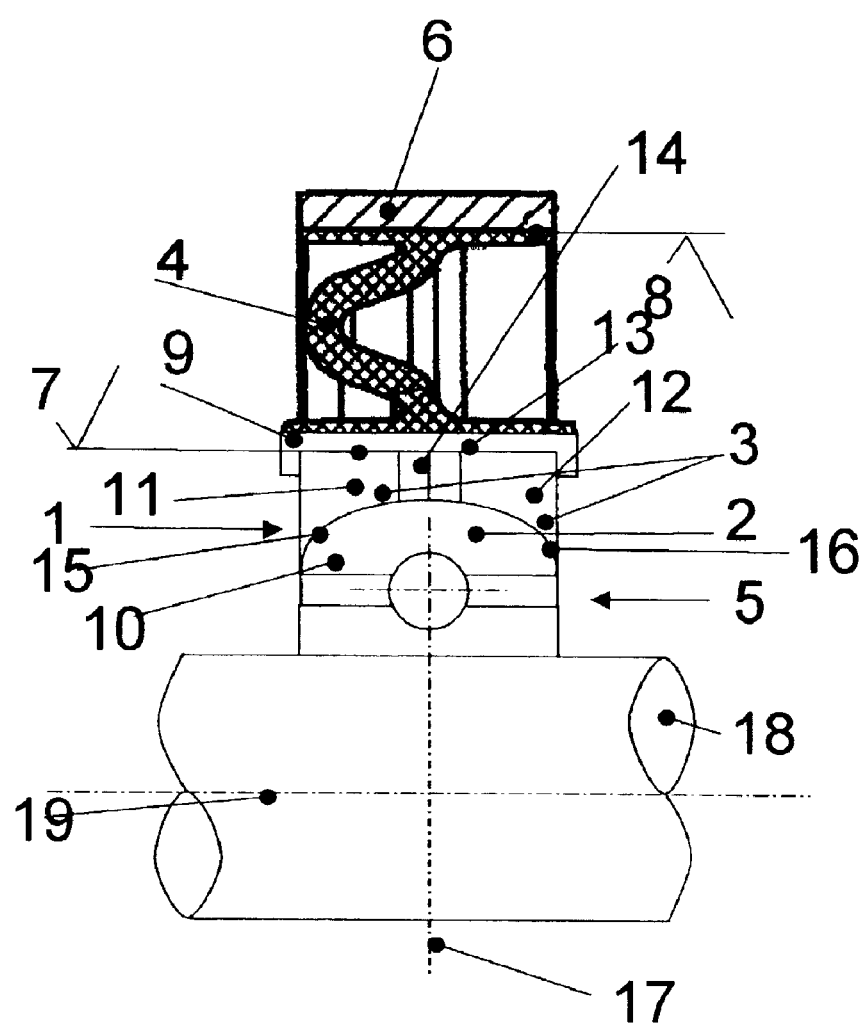
FIGS. 3a and 3b show a third exemplary embodiment, similar to the second exemplary embodiment in FIGS. 2a and 2b, the spherical body being formed by the outer ring of a rolling bearing.

FIGS. 1a and 1b, 2a and 2b, and 3a and 3b show a bearing system according to the present invention that is used to mount a cardan shaft 18 of a motor vehicle on bearings. In FIGS. 1a, 2a and 3a, cardan shaft 18 extends parallel to axis of symmetry 19, while in FIGS. 1b, 2b and 3b, cardan shaft 18 executes cardanic movements.

FIGS. 1a and 2b, 2a and 2b and 3a and 3b show a bearing arrangement that includes a ball-and-socket joint 1, ball-and-socket joint 1 having an annular spherical body 2 and a congruently shaped, socket-type guide ring 3 for accommodating spherical body 2. As shown here in a longitudinal section, the outer circumference of spherical body 2 has a largely semispherical shape. Housing 6 surrounds the outer circumference of ball-and-socket joint 1 at a radial distance, spring element 4 being provided in the gap formed by the distance. Spring element 4 is made of an elastomer material and, in the longitudinal section view, has a largely bent shape, the bend being largely C-shaped and open in the axial direction. Spring element 4 illustrated here is elastic in both the radial and axial directions so that spring element 4 is able, for example, to absorb thermal expansions of cardan shaft 18 in the axial direction of the bearing system or unbalanced states of the bearing system in the radial direction.

Figure 3B:
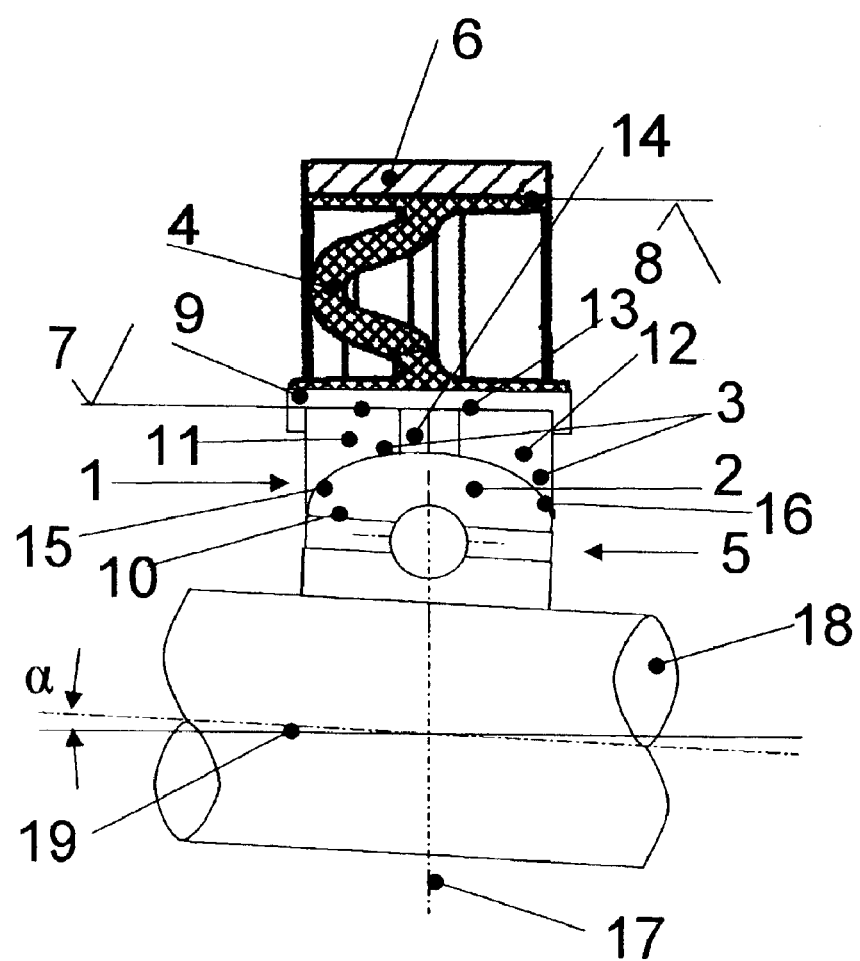

The position of the ball-and-socket joint within the bearing system is of importance. As shown in FIGS. 1b, 2b and 3b, the location of guide ring 3 and spring element 4 relative to housing 6 has not changed even though cardan shaft 18 is executing a cardanic movement, compared to the representations in FIGS. 1a, 2a and 3a, respectively. Facing surfaces 7, 8 of ball-and-socket joint 1 and housing 6 are always positioned parallel to each other in FIGS. 1a through 3a as well as FIGS. 1b through 3b; facing surfaces 7, 8 of ball-and-socket joint 1 and housing 6 are always positioned relative to each other in a manner that avoids relative cardanic movements during the operation of the bearing system as intended, as are the connecting surfaces of spring element 4 on the radially adjacent components. Due to ball-and-socket joint 1 and its location, the cardanic movement of crankshaft or cardan shaft 18 has no effect on stresses within spring element 4.

FIGS. 1a and 1b show an exemplary embodiment in which spring element 4 is directly vulcanized onto surfaces 7, 8 of the radially adjacent parts, in this case ball-and-socket joint 1 and housing 6. According to the exemplary embodiment illustrated in FIG. 2, ball-and-socket joint 1 is also designed in two parts and includes spherical body 2 and guide ring 3.

The difference between the exemplary embodiment in FIGS. 2a and 2b and the one in FIGS. 1a and 1b lies in that spring element 4 is connected to the inside of a sleeve 9 in the radial reaction, sleeve 9 radially surrounding the outside of ball-and-socket joint 1 and being non-rotatably connected to the latter. Sleeve 9 is preferably connected to ball-and-socket joint 1 so that is removable without being destroyed.

The difference between the exemplary embodiment in FIGS. 3a and 3b and those described above lies in that, in a longitudinal section view of the sealing system, guide ring 3 is designed in two parts and includes two shells 11, 12, shells 11, 12 being positioned next to each other at an axial distance. Gap 13 formed by the distance is designed as a lubricant groove 14 for lubricating contact surfaces 15, 16 of spherical body 2 and guide ring 3. Shells 11, 12 also have a mirror-symmetrical design relative to imaginary radial plane 17. The surface of bearing 5 radially facing spring element 4 has the same shape as spherical body 2 and is positioned in the congruently shaped recess of guide ring 3.

In FIGS. 1a and 1b and FIGS. 2a and 2b, it is also possible to provide an appropriately designed one-piece component instead of spherical body 2 and the separate ring 10 of bearing 5, for example, as illustrated in FIGS. 3a and 3b. The ball-and-socket joint 1 and bearing 5 together define a bearing section.

The unwanted mechanical stresses that occur in bent spring element 4 are minimized through the use and positioning of ball-and-socket joint 1. "During operation" as defined herein means during operation of the bearing system as intended.

"Spherical" as defined herein may include only a part of a sphere, and "a ball-and-socket joint" as defined herein may include a joint which has only part of a ball as the interior component.

What is claimed is:

1. A bearing system comprising:
   a housing;
   an elastic annular spring element made of an elastomer material;
   a bearing section including a bearing and a ball-and-socket joint having an annular spherical body and a guide ring for accommodating the spherical body, the ball-and-socket joint being radially connected to the elastic annular spring element and having a joint facing surface facing the spring element;
   the spring element being connected radially to the bearing section and to the housing on a side of the spring element facing radially away from the ball-and-socket joint, the housing having a housing facing surface facing the spring element;
   the bearing capable of executing cardanic movements relative to the housing; and
   the joint facing surface and the housing facing surface being positioned so as to avoid relative cardanic movements during operation;
   the spring element being a single piece of elastomeric material.

2. A bearing system comprising:
   a housing;
   an elastic annular spring element made of an elastomer material;
   a bearing section including a bearing and a ball-and-socket joint having an annular spherical body and a guide ring for accommodating the spherical body, the ball-and-socket joint being radially connected to the elastic annular spring element and having a joint facing surface facing the spring element;
   the spring element being connected radially to the bearing section and to the housing on a side of the spring element facing radially away from the ball-and-socket joint, the housing having a housing facing surface facing the spring element;
   the bearing capable of executing cardanic movements relative to the housing; and
   the joint facing surface and the housing facing surface being positioned so as to avoid relative cardanic movements during operation;

the spring element being a single piece of elastomeric material.

3. The bearing system as recited in claim 2 wherein the spring element is adhesively joined to the housing and joint facing surfaces.

4. The bearing system as recited in claim 1 wherein the bearing section includes a sleeve surrounding the ball-and-socket joint, the spring element being joined at least on a side facing the ball-and-socket joint to the sleeve.

5. The bearing system as recited in claim 1 wherein the spherical body forms a constituent part of the bearing.

6. A bearing system comprising:

a housing;

an elastic annular spring element made of an elastomer material;

a bearing section including a bearing and a ball-and-socket joint having an annular spherical body and a guide ring for accommodating the spherical body, the ball-and-socket joint being radially connected to the elastic annular spring element and having a joint facing surface facing the spring element;

the spring element being connected radially to the bearing section and o the housing on a side of the spring element facing radially away from the ball-and-socket joint, the housing having a housing facing surface facing the spring element;

the bearing capable of executing cardanic movements relative to the housing; and the joint facing surface and the housing facing surface being positioned so as to avoid relative cardanic movements during operation;

the bearing being a roller bearing and the spherical body being formed by an outer ring of the rolling bearing.

7. The bearing system as recited in claim 1 wherein, in a longitudinal view, the guide ring has a two-part design and includes two shells, the shells being positioned next to each other at an axial distance.

8. The bearing system as recited in claim 7 wherein a gap formed by the axial distance is designed as a lubricant groove for lubricating contact surfaces of the spherical body and the guide ring.

9. The bearing system as recited in claim 7 wherein the shells have a mirror-symmetrical design relative to an imaginary radial plane intersecting the bearing system in an axial center.

10. The bearing system as recited in claim 1 wherein the spring is C-shaped.

11. The bearing system as recited in claim 1 wherein the spring is elastic both radially and axially.

12. The bearing system as recited in claim 1 wherein the elastomer material covers the joint facing surface and the housing facing surface and includes a section extending radially between the elastomer material on the joint facing surface and the elastomer material on the housing facing surface.

13. The bearing system as recited in claim 1 wherein the spring element is vulcanized to the joint facing surface and the housing facing surface.

14. The bearing system as recited in claim 1 wherein the guide ring has the joint facing surface, the guide ring being limited in the axial direct on solely by the spring element and spherical body.

15. A bearing system comprising:

a housing;

an elastic annular spring element made of an elastomer material;

a bearing section including a bearing and a ball-and-socket joint having an annular spherical body and a guide ring for accommodating the spherical body, the ball-and-socket joint being radially connected to the elastic annular spring element and having a join facing surface facing the spring element;

the spring element being connected radially to the bearing section and to the housing on a side of the spring element facing radially away from the ball-and-socket joint, the housing having a housing facing surface facing the spring element;

the bearing capable of executing cardanic movements relative to the housing; and the joint facing surface and the housing facing surface being positioned so as to avoid relative cardanic movements during operation;

the guide ring having the joint facing surface, the guide ring being limited in the axial direction solely by the spring element and spherical body.

16. A cardan shaft bearing comprising:

a housing;

an elastic annular spring element made of an elastomer material;

a bearing section including a bearing and a ball-and-socket joint having an annular spherical body and a guide ring for accommodating the spherical body, the ball-and-socket joint being radially connected to the elastic annular spring element and having a join facing surface facing the spring element;

the spring element being connected radially to the bearing section and to the housing on a side of the spring element facing radially away from the ball-and-socket joint, the housing having a housing facing surface facing the spring element;

the bearing being connected to the cardan shaft and capable of executing cardanic movements relative to the housing; and the joint facing surface and the housing facing surface being positioned so as to avoid relative cardanic movements during operation;

the spring element being a single piece of elastomeric material.

17. A bearing system comprising:

a housing;

an elastic annular spring element made of an elastomer material;

a bearing section including a bearing and a ball-and-socket joint having an annular spherical body and a guide ring for accommodating the spherical body, the ball-and-socket joint being radially connected to the elastic annular spring element and having a join facing surface facing the spring element;

the spring element being connected radially to the bearing section and to the housing on a side of the spring element facing radially away from the ball-and-socket joint, the housing having a housing facing surface facing the spring element;

the bearing capable of executing cardanic movements relative to the housing; and the joint facing surface and the housing facing surface being positioned so as to avoid relative cardanic movements during operation;

the spring being C-shaped.

* * * * *